July 31, 1956  F. M. NASH  2,756,762
PRESSURE TANK AIR CHARGER ASSEMBLY
Filed May 25, 1953
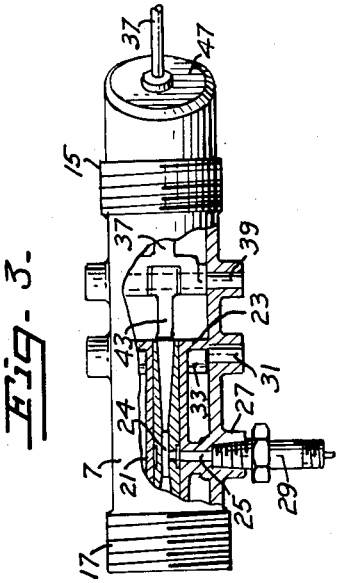
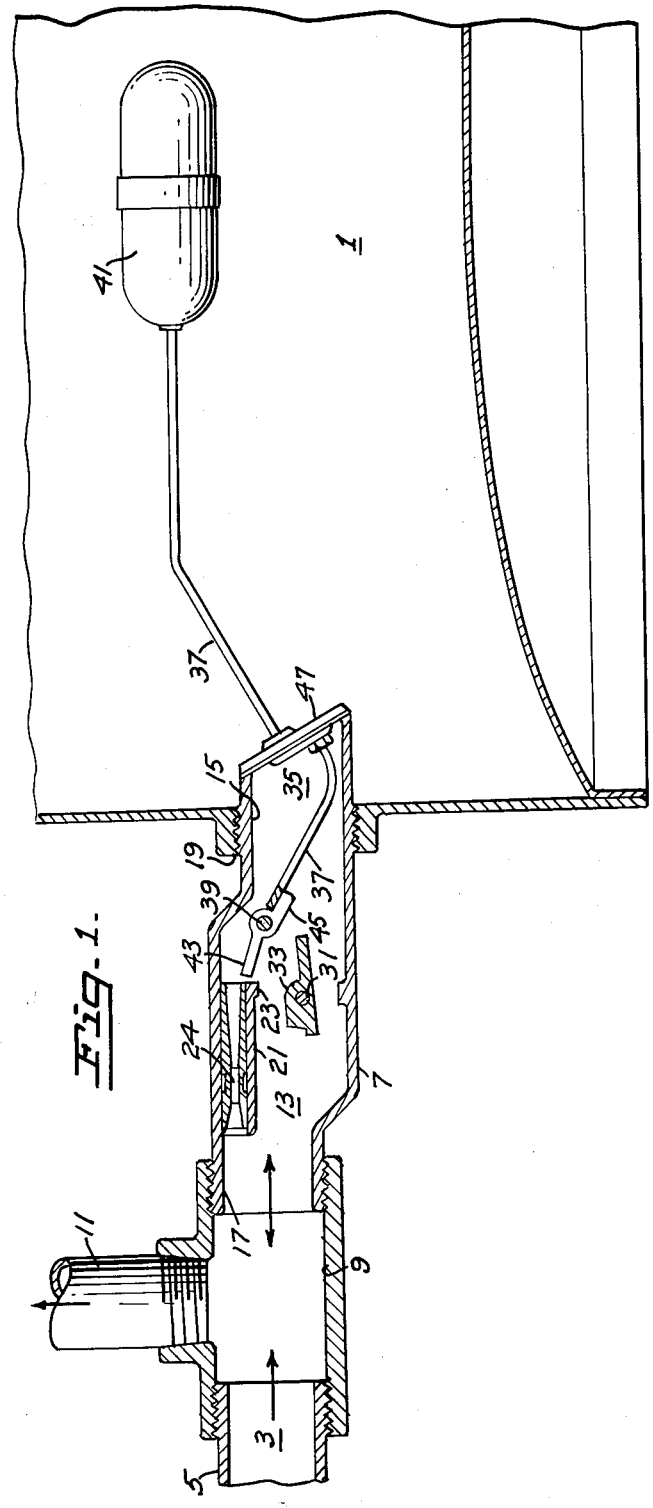
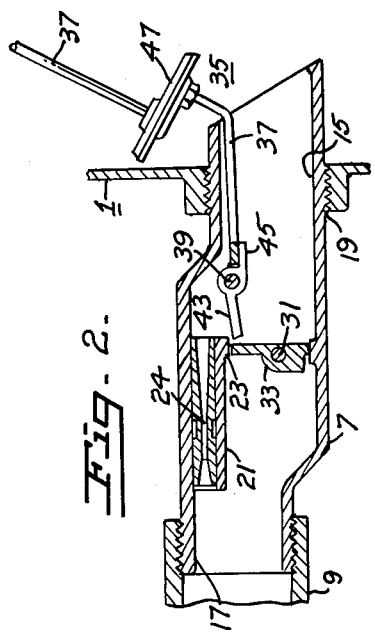
INVENTOR.
FLOYD M. NASH
BY Bruce & Brosler
HIS ATTORNEYS

United States Patent Office 2,756,762
Patented July 31, 1956

2,756,762

PRESSURE TANK AIR CHARGER ASSEMBLY

Floyd M. Nash, Kensington, Calif., assignor to Jacuzzi Bros., Incorporated, a corporation of California Application May 25, 1953, Serial No. 357,329

7 Claims. (Cl. 137—211)

My invention relates to pressure systems for pumping water or the like and more particularly to an air charger assembly for the pressure tank of such a system.

Among the objects of my invention are:

1. To provide a novel and improved air charger assembly for a pressure tank in a water system;

2. To provide a novel and improved air charger assembly which will prevent loss of air cushion from a pressure tank should conditions be such as would ordinarily cause the water level in such tank to drop to and expose an inlet or discharge opening in such tank;

3. To provide a novel and improved air charger assembly for a pressure tank in a water system, which functions independently of the suction line pressures and therefore is applicable to both deep as well as shallow well installations;

4. To provide a novel and improved air charger system for a pressure tank which minimizes the requirements of fittings or mountings on the tank wall;

5. To provide a novel and improved air charger for a pressure tank whereby to obtain and maintain optimum ratio of air to water in such tank;

6. To provide a novel and improved air charger for a pressure tank which will determine air intake to such tank independently of pressure conditions in the tank;

7. To provide a novel and improved air charger assembly for a pressure tank, which structurally is of simple design and may be ruggedly constructed.

Additional objects of my invention will be brought out in the following description of a preferred embodiment of the same taken in conjunction with the accompanying drawings wherein—

Figure 1 is a fragmentary view in section of the pertinent portion of a pressure system embodying the present invention, and depicting the air charger in one condition of operation;

Figure 2 is a view in section through the air charger assembly, depicting it in another condition of operation;

Figure 3 is a plan view of the air charger assembly of the present invention, partly in section to expose added details of the component parts.

Referring to the drawings for details of my invention in its preferred form, only that portion of a pressure system has been illustrated which includes the air charger assembly of the present invention.

The particular pressure system selected for illustrative purposes only, involves a pressure tank 1, a discharge pipe connection 3 leading from the pump unit to the tank, which pipe connection has been split into two sections 5 and 7 to incorporate therein a T-connection 9, to which is connected the main discharge line 11 to service.

In this particular system, service will be supplied either from the tank or directly from the pump unit, or from both simultaneously, depending on pressure conditions in the tank and demands of service. Accordingly, while the flow from the pump unit will always be in one direction, the flow within that section of the discharge line between the service connection and the tank, may be in either direction depending upon conditions.

As is well known, in pressure systems, water is stored in a pressure tank under pressure of an air cushion, the pressure and volume of which must be maintained within predetermined limits to realize a satisfactory operating system. These conditions are normally controlled by a pressure switch and an air charger working in harmony with one another, the pressure switch determining operating periods of the pump unit to maintain pressure in the tank, while the air charger, during such operating periods, normally takes air into the tank to replenish that which may have been absorbed in the water and carried out of the tank when water is discharged therefrom.

Should the service drain on a system exceed that of the ability of the pump unit to supply, or the capacity of the well to produce, it will become apparent that the system cannot, under those conditions, maintain adequate supply or water under pressure in the tank, whereupon the level of water in the tank will drop until it exposes an open connection in the tank and the air will escape, so long as the pressure in the tank is above atmospheric pressure.

The air charger 13 of the present invention, which not only supplies the air cushion requirements in the tank, but also precludes loss of such air cushion under the conditions noted, involves a housing which may constitute that section 7 of the discharge line from the pump unit lying between the service line and the tank.

This housing is preferably one having cylindrical ends 15 and 17, which from the view point of practical design, are slightly offset to either side of the longitudinal axis of the housing, and are threaded for coupling purposes. The one end 15 is utilized for mounting the device in the bung opening 19 of the pressure tank, while the other permits coupling of the housing to the T-connection 9, this latter end, in the installation of the device, being preferably at a slightly higher elevation than the tank connecting end in order to conveniently install the aspirator.

Adjacent the roof of the housing, is a longitudinal passage defining wall 21, formed integral with and terminating in a transverse ridge 23 depending from the roof of the housing. In the passage defined by this wall 21, there is disposed an aspirator 24. This aspirator at its maximum point of constriction, has an air intake connection to the atmosphere by way of a passage 25 through the wall of the housing, which passage terminates in a recessed boss 27 into which is threadedly secured, a valve 29 of the Shrader valve type.

Transversely of the housing, in the plane of the transverse ridge 23, there is swingably mounted on a cross pin 31, a swing type valve 33, the portion above the pin being of greater area than the portion below, whereby said valve, unless blocked, will open in response to water pressure from either direction. The lower portion is preferably weighted to assure the closing of such valve in the absence of forces tending to hold the same in open position.

In its open position, full flow of water to and from the tank can take place, while in the closed position of such valve, the flow will be restricted to that permitted through the aspirator. Though always free to open in response to tank discharge, the open or closed position of the swing valve during pumping cycles, is made responsive to the liquid level conditions existing in the pressure tank at the start of flow into the tank, the swing valve being permitted to open under conditions of low liquid level in the tank, while the valve is maintained in its closed condition during high liquid level conditions in the tank. However, if conditions at start of such flow, permit of opening of the valve, then rise in level of water in the tank during that pumping cycle will not alter the open condition of the valve.

Such response relationship is brought about through float controlled means 35 involving a float arm 37 extending into the tank mounting end of the housing where it is hingedly anchored therein on a cross pin 39, while at its free end, the float arm carries a float 41 of a size adapted to fit through the bung opening in the pressure tank. A pawl 43, also hingedly secured to said cross pin 39 is adapted to swing between a down position behind the swing valve to preclude opening thereof in the direction of flow to the tank, and an up position clearing said swing valve to permit such opening. The down or up position is controlled by the float arm in cooperation with a tail 45 formed integral with the pawl and extending beneath the float arm, whereby for low level conditions in the tank, the pawl will be forcibly raised to its up position, while for high level conditions, the pawl will be permitted to drop to its down position, the critical point of changeover from one to the other preferably occurring when the float occupies a position substantially midway of its range of travel.

At some intermediate point on the float arm, there is installed a disc type float valve 47, the location thereof being such as to enable the valve to close the tank mounting end of the housing when the float drops to a point representing a predetermined permissible minimum level of liquid in such tank. Such predetermined minimum level will be that level just slightly above that at which escape of the air from the tank through the bung opening may be anticipated.

To realize a most effective valve action against this end of the air charger assembly housing, the end of the housing is preferably terminated in a plane forming an angle with the vertical. The valve under these conditions will not be circular but will be of oval shape to match the angularly exposed end of the housing.

When a pump pressure system incorporating the present invention, is first installed and set into operation, the water pumped into the tank will trap the air existing therein and compress it more and more with rise in water level until the maximum operating pressure of the system is reached as determined by the conventional pressure switch normally associated with the tank.

At the start of this operation, the float valve will be in its seating position, but immediately upon pumping of water to the tank, the pressure of the water will lift the float valve off its seat and permit "filling" of the pressure tank.

At the conclusion of this operation, the pawl will have dropped while the swing valve is still in its open position, but this will not preclude such valve from restoring itself from its open position since the pawl is hinged independently of the float arm. Upon the swing valve restoring itself to its closed position, the pawl will again drop to its down position and restrain the swing valve from thereafter opening in the direction of flow to the pressure tank, though it is free to swing in the opposite direction in response to discharge of water from the tank to service.

Inasmuch as the first filling of the pressure tank does not supercharge the same, or in other words, does not create the desired air cushion volume for normal operation of the system, the pressure will drop more quickly with discharge to service and the pump unit will again go into operation while the liquid level is still high in the pressure tank. Since the swing valve under these conditions is locked against opening, the flow of water into the tank is restricted substantially exclusively to the aspirator, whereby additional air will be drawn into the tank, thereby contributing to the development of a supercharged condition therein. As this condition is approached, the periods of pump unit operation become more widely spaced in point of time and ultimately reach the desired normal operating condition of the system.

Thereafter, for normal operation of the system, the swing valve will be restrained against opening in the direction of flow to the tank, only when the condition within the tank calls for additional charges of air to maintain the desired air to water ratio.

On the other hand, should complete loss of the air cushion be threatened, due to a drawing down of the water level to a point approaching the bung opening, the float valve will close off the escape route before such loss can occur.

From the foregoing description of my invention in its preferred form, it will be apparent that the same fulfills all the objects attributable thereto and while I have disclosed the same in considerable detail, I do not desire to be limited in my protection to such details except as may be necessitated by the appended claims.

I claim:

1. An air charger assembly for a pressure tank having a threaded bung opening, comprising a housing having open ends with one end threaded for mounting in such opening, an aspirator in said housing in the flow-path of liquid therethrough, valve means in said housing substantially blocking the remainder of said flow-path in the closed position of said valve means, and means responsive to liquid level conditions in such tank for allowing full flow of liquid to such tank during low level conditions and holding said valve against opening during high level conditions to force water flowing to such tank to pass substantially entirely through said aspirator, said means involving a float arm extending into the tank mounting end of said housing and hingedly anchored therein, a float on the free end of said arm, a pawl hingedly supported in said housing and adapted to swing between a down position behind said valve means to preclude opening thereof in the direction of flow to such tank, and an up position clearing said valve means to permit of such opening thereof, said pawl having a tail extending beneath said float arm whereby for low level conditions in such tank, said pawl will be raised to its up position while for high level conditions, said pawl will drop to its down position, and a disk type float valve carried by said float arm at a point thereon, enabling the same to close the tank mounting end of said housing when said float drops to a point representing a predetermined permissible minimum level of liquid in such tank.

2. An air charger assembly for a pressure tank having a threaded bung opening, comprising a housing having open ends with one end threaded for mounting in such opening, an aspirator in said housing in the flow-path of liquid therethrough, valve means in said housing substantially blocking the remainder of said flow-path in the closed position of said valve means, said valve means including a valve swingably mounted on a pin transversely of said housing, and means responsive to liquid level conditions in such tank for allowing full flow of liquid to such tank during low level conditions and holding said valve against opening during high level conditions to force water flowing to such tank to pass substantially entirely through said aspirator, said means involving a float arm extending into the tank mounting end of said housing and hingedly anchored therein on a cross pin, a float on the free end of said arm, a pawl also hingedly secured to said cross pin and adapted to swing between a down position behind said swing valve to preclude opening thereof in the direction of flow to such tank, and an up position clearing said swing valve to permit of such opening of the valve, said pawl having a tail extending beneath said float arm whereby for low level conditions in such tank, said pawl will be raised to its up position while for high level conditions, said pawl will drop to its down position, and a disk type float valve carried by said float arm at a point thereon, enabling the same to close the tank mounting end of said housing when said float drops to a point representing a predetermined permissible minimum level of liquid in such tank.

3. An air charger assembly for a pressure tank having a bung opening, comprising a housing having one end adapted for mounting in such opening, an aspirator in said housing in the flow-path of liquid therethrough, valve means in said housing substantially blocking the remainder of said flow-path in the closed position of said valve means, said valve means being actuable from one position to another by flow pressure in said housing in the direction of such tank, latch means adapted in one position thereof, to restrain such actuation of said valve means, and means responsive to predetermined change in liquid level in such tank for freeing said valve means from such restraint to permit actuation thereof by such flow pressure.

4. An air charger assembly for a pressure tank having a bung opening, comprising a housing having one end adapted for mounting in such opening, an aspirator in said housing in the flow-path of liquid therethrough, valve means in said housing substantially blocking the remainder of said flow-path in the closed position of said valve means, said valve means being actuable from one position to another by flow pressure in said housing in the direction of such tank, latch means adapted in one position thereof, to restrain such actuation of said valve means, means responsive to predetermined changes in liquid level in such tank for freeing said valve from such restraint to permit actuation thereof by such flow pressure, and means responsive to a drop in liquid level in such tank approaching the level of such bung opening, but before reaching the same, for completely blocking liquid flow through said housing.

5. An air charger assembly for a pressure tank having a bung opening, comprising a housing having one end adapted for mounting in such opening, an aspirator in said housing in the flow-path of liquid therethrough, valve means in said housing substantially blocking the remainder of said flow-path in the closed position of said valve means, said valve means including a valve swingably mounted on a pin transversely of said housing, and means responsive to liquid level conditions in such tank for allowing full flow of liquid to such tank during low level conditions and holding said valve against opening during high level conditions to force water flowing to such tank to pass substantially entirely through said aspirator, said means involving a float arm extending into the tank mounting end of said housing and hingedly anchored therein on a cross pin, a float on the free end of said arm, and a pawl also hingedly secured to said cross pin and adapted to swing between a down position behind said swing valve to preclude opening thereof in the direction of flow to such tank, and an up position clearing said swing valve to permit of such opening of the valve, said pawl having a tail extending beneath said float arm whereby for low level conditions in such tank, said pawl will be raised to its up position while for high level conditions, said pawl will drop to its down position.

6. An assembly for a pressure tank having a bung opening, comprising a housing having an end thereof adapted for mounting in such bung opening, a float arm hingedly anchored to said housing adjacent the tank mounting end thereof, a float on the free end of said float arm, valve means in its closed position adapted to block flow of liquid through said housing, and means under control of said float arm for enabling said valve means to close from an open position, when the liquid in such tank drops to a level approaching such bung opening but before reaching the same.

7. An air charger assembly for a pressure tank having a bung opening for connection to a pump unit, such assembly comprising an air charger assembly housing having open ends with one end adapted for mounting to such tank at the bung opening therein and its other end adapted for coupling to such pump unit, an aspirator in said housing in the flow path of liquid therethrough, valve means responsive to a predominance of flow pressure through said housing in the direction of such tank when the liquid level in such tank is above a predetermined normal operating range, for closing said flow path to the exclusion of said aspirator, valve means adapted to close the entire path through said housing when the liquid level in such tank drops below such normal operating range and before exposing such bung opening, and means for precluding both valve means from blocking liquid flow through said housing while the liquid level in such tank is within the range of normal operating levels.

References Cited in the file of this patent

UNITED STATES PATENTS

| | | |
|---|---|---|
| 2,292,509 | Carson | Aug. 11, 1942 |
| 2,319,554 | Penn et al. | May 18, 1943 |